United States Patent
Robbins

(10) Patent No.: US 12,418,520 B2
(45) Date of Patent: Sep. 16, 2025

(54) HOSTED SERVICES WITH ACCOUNT SWITCHING FOR MULTIPLE USER ACCOUNTS IN A WEB BROWSER SESSION

(71) Applicant: Peter Robbins, Sydney (AU)

(72) Inventor: Peter Robbins, Sydney (AU)

(73) Assignee: ATLASSIAN PTY LTD., Sydney (AU)

(*) Notice: Subject to any disclaimer, the term of this patent is extended or adjusted under 35 U.S.C. 154(b) by 179 days.

(21) Appl. No.: 18/372,033

(22) Filed: Sep. 22, 2023

(65) Prior Publication Data
US 2025/0106195 A1   Mar. 27, 2025

(51) Int. Cl.
H04L 9/40         (2022.01)
H04L 67/141     (2022.01)

(52) U.S. Cl.
CPC ...... *H04L 63/0807* (2013.01); *H04L 63/0876* (2013.01); *H04L 63/10* (2013.01); *H04L 67/141* (2013.01)

(58) Field of Classification Search
CPC . H04L 63/0807; H04L 63/0876; H04L 63/10; H04L 63/0815; H04L 67/141
See application file for complete search history.

(56) References Cited

U.S. PATENT DOCUMENTS

| | | | | |
|---|---|---|---|---|
| 10,938,915 B1* | 3/2021 | Schwesinger | ........... | H04L 67/14 |
| 2008/0209338 A1* | 8/2008 | Li | .............. | G06F 16/9535 |
| | | | | 715/764 |
| 2014/0108667 A1* | 4/2014 | Reddy | .............. | G06F 16/954 |
| | | | | 709/228 |
| 2015/0347616 A1* | 12/2015 | Levi | .............. | G06F 16/9535 |
| | | | | 715/234 |
| 2023/0283677 A1* | 9/2023 | Doman | .............. | H04L 67/02 |
| | | | | 709/219 |

OTHER PUBLICATIONS

K. Kumar and J. Bose, "User data management by tabs during a browsing session," Fourth International Conference on Digital Information and Communication Technology and its Applications (DICTAP), Bangkok, Thailand, 2014, pp. 258-263, doi: 10.1109/DICTAP.2014.6821692. (Year: 2014).*

* cited by examiner

*Primary Examiner* — Robert B Leung
(74) *Attorney, Agent, or Firm* — Brownstein Hyatt Farber Schreck, LLP

(57) ABSTRACT

Embodiments include a method for hosting secure content between a host service and a client device. One example includes causing display of a graphical user interface on a browser application executing on the client device where the user interface includes a first tab associated with a first session between the browser application and the host service using a first account associated with a user and a second tab associated with a second session between the browser application and the host service using a second account associated with the user. In response to a user selection of the second tab while the first tab is displayed, receiving the first session token and a temporary account identifier, identifying a second token, using the temporary account identifier, and causing the browser application to display second secure content within the second tab associated with the second session.

20 Claims, 8 Drawing Sheets

HOSTED SERVICES WITH ACCOUNT SWITCHING FOR MULTIPLE USER ACCOUNTS IN A WEB BROWSER SESSION

FIELD

The described embodiments relate to and, in particular, to methods and systems for providing content using client-server protocols and more particular to method and systems for updating secure session information when a user switches between browser tabs associated with different accounts.

BACKGROUND

Organizations are increasingly using various software products to facilitate communication and workflow for individuals and teams. In many cases, software products may be hosted by a server and accessed using a browser. A user may login to a software product using a set of credentials, and once logged in, a session cookie may be stored at the client device and information from the cookie may be used to facilitate interactions with the software product. However, traditional browser cookies may not facilitate seamless transitions between different user accounts, particularly when operating a session or multiple sessions with the same software product.

SUMMARY

Embodiments are directed a method for hosting secure content between a host service and a client device. The method can include causing display of a graphical user interface on a browser application executing on the client device, where the graphical user interface can include a first tab associated with a first session between the browser application and the host service using a first account associated with a user, and a second tab associated with a second session between the browser application and the host service using a second account associated with the user. In response to a user selection of the first tab, the methods can include receiving a first session token from the client device at a server operating the host service, and in response to determining that the first session token is valid, causing the browser application to display first secure content within the first tab associated with the first session in the first tab. In response to a user selection of the second tab while the first tab is displayed, the method can include receiving the first session token and a temporary account identifier associated with the second account at the server operating the host service, and identifying, using the temporary account identifier, a second token stored by the host service and associated with the second account. In response to determining that the second token is valid, the methods can include causing the browser application to display second secure content within the second tab associated with the second session.

Embodiments are further directed to a method for hosting secure browser sessions comprising multiple browser tabs each associated with a different user account. The method can include hosting, by a server of a domain, a browser application operating on a client device. The browser application can include a first tab comprising first secure content that is accessed at the domain using a first session token associated with a first user account for a user, and a second tab comprising second secure content that is accessed at the domain using a second session token associated with a second user account for the user. The method can include receiving, from the client device, a first request to display the first tab associated with the first user account, the first request comprising the first session token. In response to determining that the first session token is valid, the method can include causing the client device to refresh the first secure content of the first tab, and receiving, from the client device while the first secure content on the first tab is displayed, a second request to display the second tab associated with the second user account, where the second request comprising the first session token and a temporary account identifier for the second user account. The method can include identifying, using the temporary account identifier, the second session token associated with the second user account, and in response to determining that the second session token is valid, causing the client device to refresh the second secure content of the second tab.

Embodiments can also include a server system that includes a memory allocation defined by a data store storing one or more executable assets and a working memory allocation, and a processor allocation configured to load the one or more executable assets from the data store and into the working memory allocation to instantiate an instance of a client application on a client device. The one or more executable assets can be configured to cause display of a graphical user interface on a browser application executing on the client device. The graphical user interface can include a first tab associated with a first session between the browser application and a host service using a first account associated with a user, and a second tab associated with a second session between the browser application and the host service using a second account associated with the user. In response to a user selection of the first tab, the system can receive a first session token from the client device, and in response to determining that the first session token is valid, cause the browser application to display first secure content within the first tab associated with the first session in the first tab. In response to a user selection of the second tab while the first tab is displayed, the system can receive the first session token and a temporary account identifier associated with the second account, and identifying, using the temporary account identifier, a second token stored by the host service and associated with the second account. In response to determining that the second token is valid, the system can cause the browser application to display second secure content within the second tab associated with the second session.

BRIEF DESCRIPTION OF THE DRAWINGS

The disclosure will be readily understood by the following detailed description in conjunction with the accompanying drawings, wherein like reference numerals designate like structural elements, and in which.

Figure 1:
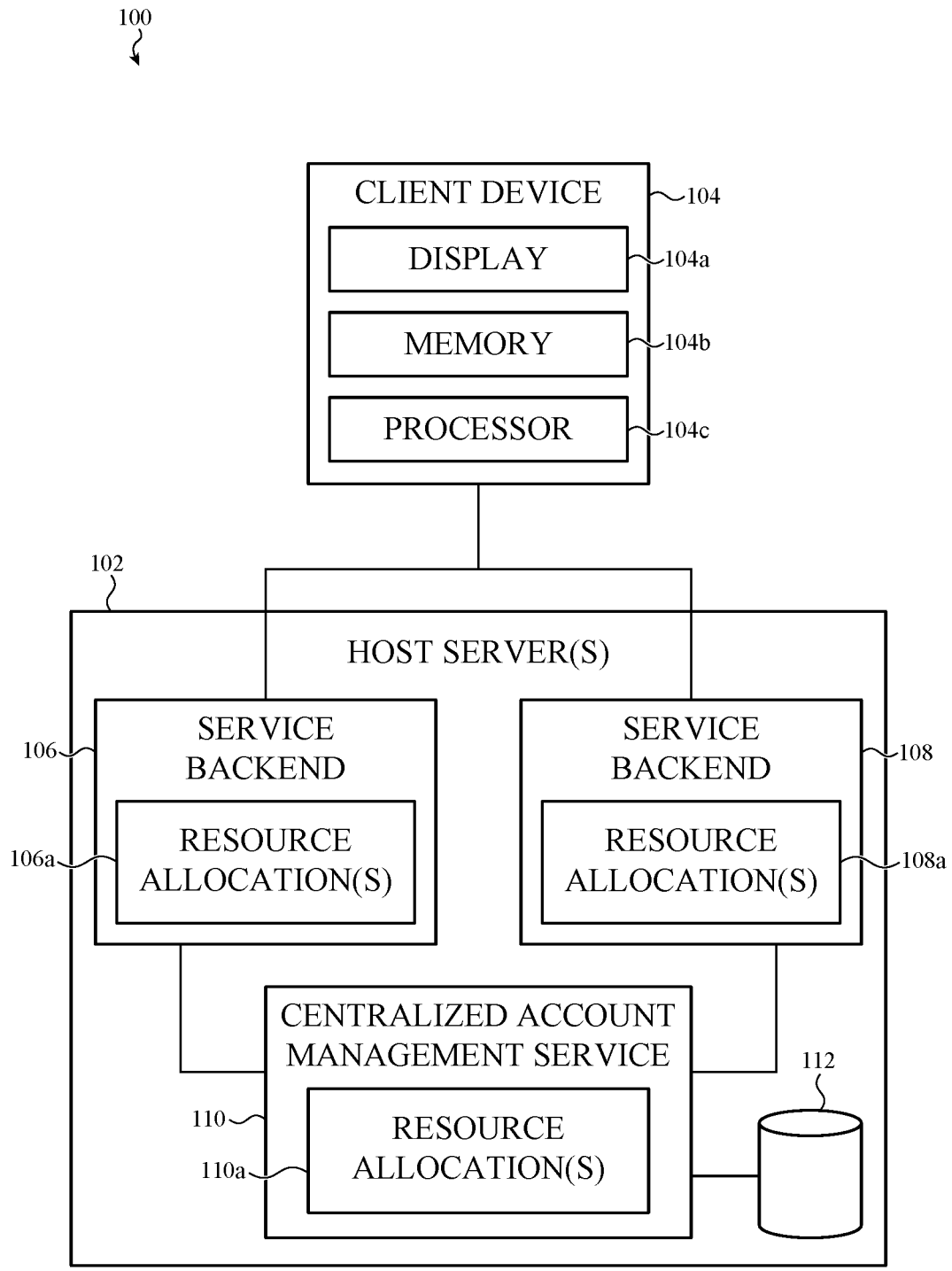
FIG. 1 depicts a simplified diagram of an example system in which various features of the present disclosure may be implemented.

While the invention as claimed is amenable to various modifications and alternative forms, specific embodiments are shown by way of example in the drawings and are described in detail. It should be understood that the drawings and detailed description are not intended to limit the invention to the particular form disclosed. The intention is to cover all modifications, equivalents, and alternatives falling within the scope of the present invention as defined by the appended claims.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to methods for hosting secure content between a host service and a client device. A user may use a browser application to access one or more services provide by a host service. The service(s) may be supported by a service backend that provides content associated with the service to a client device of the user. In many cases, a user may login to a service using a set of user credentials, which may allow the service to customize content for the user and/or provide the user with secure content that is not available to other users. The host service may provide many different types of services that a user can access using a browser application including email service, an account management service, a content collaboration service, a chat service, an issue tracking service, and so on. A user may log into each of these services using a browser application to access secured content that is specific to the user.

One or more services hosted by a domain (which also may be referred to as a "backend system") are accessed using information associated with an authenticated user account and stored on a client device in a session cookie (e.g., session token or other session identification that is generated as part of an authentication process). A backend system associated with a domain may only store a single session cookie on the client device during a session between the browser and the backend system. Accordingly, during a session, the browser may not be able to support two different user accounts accessing content from the same backend system. For example, if a user opens a first browser tab and logs into a service hosted by the backend system using a first user account, the backend system may store a session cookie on the client device including a first session token. Subsequently, if a user opens a second browser tab and logs into the service hosted by the backend system using a second user account, the backend system may update the session cookie on the client device, which may replace the first session token with a second session token. Accordingly, if a user switches back to the first tab, which is associated with an active session for the first user account, the client device will attempt to use the second session token associated with the second user account to access content from the backend system. This can cause the backend system to either deny any request for content or otherwise behave unexpectedly.

In some cases, a service may provide varying levels of access to different functions, features or content of a service. Different levels of access may be based on permissions associated with specific content. For example, the permissions for content may define specific roles (or access levels) that can access the content. A specific user account may be associated with a role (or access level) and the system may determine whether a user is authorized to access specific content based on the defined permission for the content and the role/access level associated with the user account. For example, a user may have an administrative account that is associated with an administrative role, which may allow the administrative account to access content and/or features of a service based on the assigned administrative role. In some cases, a user may have additional accounts for the service, which may be associated with different roles/access levels. For example, the user may have a second, non-administrative, user account that is associated with a different role (e.g., having a lower access level) that is used to access content/features of the service.

In some cases, the administrative account may be used to develop or otherwise define features/content that is provided by a service to non-administrative users. The user may use a first tab of a browser application to log into the service using their administrative account and enable, define or otherwise modify how a feature of the service operates. The user may open a second tab and log into the service using a second, non-administrative account, to interact with the service based on a second access level associated with the second account—for example to test one or more changes made using the administrative account. However, logging into the service using the second, non-administrative, user account may cause the service backend to update a session cookie for the service stored by the browser application at the client device. The updated cookie may now include an access token that is associated with the second user account. Accordingly, if a user switches back to the first tab, associated with the administrative account, the browser application will use the access token associated with the second account to try and access content from the service. This mismatch between the user account and access token can cause the service backend to deny any requests from the first tab of the browser application (associated with the first account) and/or otherwise not operate as expected.

The systems and methods described herein allow the backend system to the cause the browser application to update a session cookie with a session token (or other access credential(s)) that corresponds to a user account associated with a particular tab as a user changes between different browser tabs. For example, when a user is logged into a service with a first user account on a first browser tab (or browser window) and logged into the service with a second user account on a second browser tab (or browser window), and switches between the browser tab, the methods and systems described herein update the session cookie to include an access token that is associated with the user account for the selected tab.

The examples provided herein are primarily described in the context of switching between different browser tabs associated with different user accounts. The example of browser tabs is provided to illustrate the broader concepts described herein and it not meant to be limiting. The concepts described herein can be applied to other contexts such as a user logged into a backend system using a first user account on a first browser window and second user account on a second browser window. Additionally or alternatively, the concepts described herein can be applied to situations where a first graphical user interface associated with a first user account is used to access service from a backend system (e.g., associated with a particular domain) and a second graphical user interface associated with a second user account is used to access the same backend system. Accordingly, the concepts described herein in the context of browser tabs can be applied to other scenarios.

In some cases, the browser application can store a temporary account identifier for each tab, which provides a unique identifier that associates a particular tab with a particular user account. The service backend can store a record that associates each temporary account identifier with an access token corresponding to the user account associated with the temporary identifier. When the browser detects that a user is switching from a first tab to a second tab, the browser application can send the temporary account identifier associated with the selected tab to the service backend. The service backend can reference the received temporary identifier against its stored records that associate temporary identifiers with sessions tokens. If the service backend determines that the temporary account identifier received from the browser application is associated with an active session token, the service backend can cause the browser application to update the session cookie with the session token associated with the account for the selected tab. As a user switches between different tabs that are logged into a domain using different accounts, the browser application and service backend can update the session cookie with the access token (and/or other credentials) that are associated with the account of the selected browser tab. Accordingly, the systems and methods described herein allow a browser application to support multiple tabs that are each logged into a same host service using a different account. This allows a browser application to securely access content from a host service using multiple different user accounts.

As a user switches between tabs that are each logged into a domain with different user account, the processes herein can automatically cause the session cookie to be updated with the corresponding access token. For example, the backend system can cause the session cookie to be automatically updated with the corresponding access token, without requiring an input from a user. In some cases, as the user switches between tabs that are each logged into a domain with different user accounts, and the session cookie is updated with the corresponding access token, the browser application can be configured to display a graphical element that indicates that the user account has changed as a result of switching between the browser tabs (or browser windows).

These and other embodiments are discussed below with reference to FIGS. 1-6. However, those skilled in the art will readily appreciate that the detailed description given herein with respect to these Figures is for explanatory purposes only and should not be construed as limiting. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform" or "service backend"). In some cases, the set of host servers 102 can be physically collocated or in other cases, each may be positioned in a geographically unique location.

The set of host servers 102 can be communicably coupled to one or more client devices; one example device is shown as the client device 104. The client device 104 can be implemented as any suitable electronic device. In many embodiments, the client device 104 is personal computing devices such as desktop computers, laptop computers, or mobile phones (e.g., an electronic device 600 described with reference to FIG. 6).

The set of host servers 102 can be supporting infrastructure for one or more backend applications (also referred to as "backend services"), each of which may be associated with a particular domain that supports one or more software platforms, such as a documentation platform or an issue tracking platform. Other examples include ITSM systems, chat platforms, messaging platforms, and the like.

A portion of the set of host servers 102 can be allocated as physical infrastructure supporting a first service backend 106 and a different portion of the set of host servers 102 can be allocated as physical infrastructure supporting a second service backend 108.

The two different services may be instantiated over physical resources provided by the set of host servers 102. Once instantiated, the first service backend 106 and the second service backend 108 can each communicably couple to a centralized account management service 110 (also referred to more simply as an "account manager" or an "account service").

The centralized account management service 110 can be configured to update a session cookie for embodiments where a user is accessing the service backends 106 and 108 associated hosted by a domain. The centralized account management service 110 can cause the client device to store a session cookie for a browser hosted by the host server 102. In some cases, the browser may include multiple tab sessions that are each associated with a different user account. Accordingly, as the user instantiates a new tab session with the host server 102, the host server 102 may cause the client device 104 to update the session cookie with user account credentials (e.g., a session cookie) associated with the most recently instantiated user account.

The centralized account management service 110 can update the session cookie, stored at the client device, in response to determining that a user switched from a first tab that uses a first user account to access the backend applications to a second tab that uses a second user account to access the backend application. In some cases, the host server 102 can determine that a user switched from a first tab to a second tab based on a visibility change event.

The centralized account management service 110 may receive a temporary account identifier as part of a request to switch from a first tab to a second tab. The centralized account management service 110 may use the temporary account identifier to determine whether there is an active session for a user account associated with the temporary account identifier. In response to determining that there is an active session, the centralized account management service 110 can cause the client device 104 to update a session cookie with a session token (or other access credential(s)) that corresponds to the user account associated with the particular tab. For example, the centralized account management service 110 can cause the client device to overwrite a portion of the session cookie (e.g., an access token stored as part of the session cookie). Accordingly, as a user switches between different tabs associated with different user accounts, the centralized account management service 110 can update the session cookie with the corresponding user account access credentials (e.g., corresponding session token).

The first service backend 106 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

Similarly, the second service backend 108 can be configured to communicably couple to a second platform frontend instantiated by cooperation of a memory and a processor of the client device 104. Once instantiated, the second platform frontend can be configured to leverage a display of the client device 104 to render a graphical user interface so as to present information to a user of the client device 104 and so as to collect information from a user of the client device 104.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that all software instances described above are supported by and instantiated over physical hardware and/or allocations of processing/memory capacity of physical processing and memory hardware. For example, the first service backend 106 may be instantiated by cooperation of a processor and memory collectively represented in the figure as the resource allocations 106a. Similarly, the second service backend 108 may be instantiated over the resource allocations 108a (including processors, memory, storage, network communications systems, and so on). Likewise, the centralized account management service 110 is supported by a processor and memory and network connection (and/or database connections) collectively represented for simplicity as the resource allocations 110a. An example of an electronic device having physical hardware that supports one or more of these functions is described with reference to FIG. 6.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Further to these foregoing embodiments, it may be appreciated that a user can provide input to a frontend of a system in a number of suitable ways, including by providing input as described above to a frame rendered with support of a centralized content editing frame service.

Figure 2:
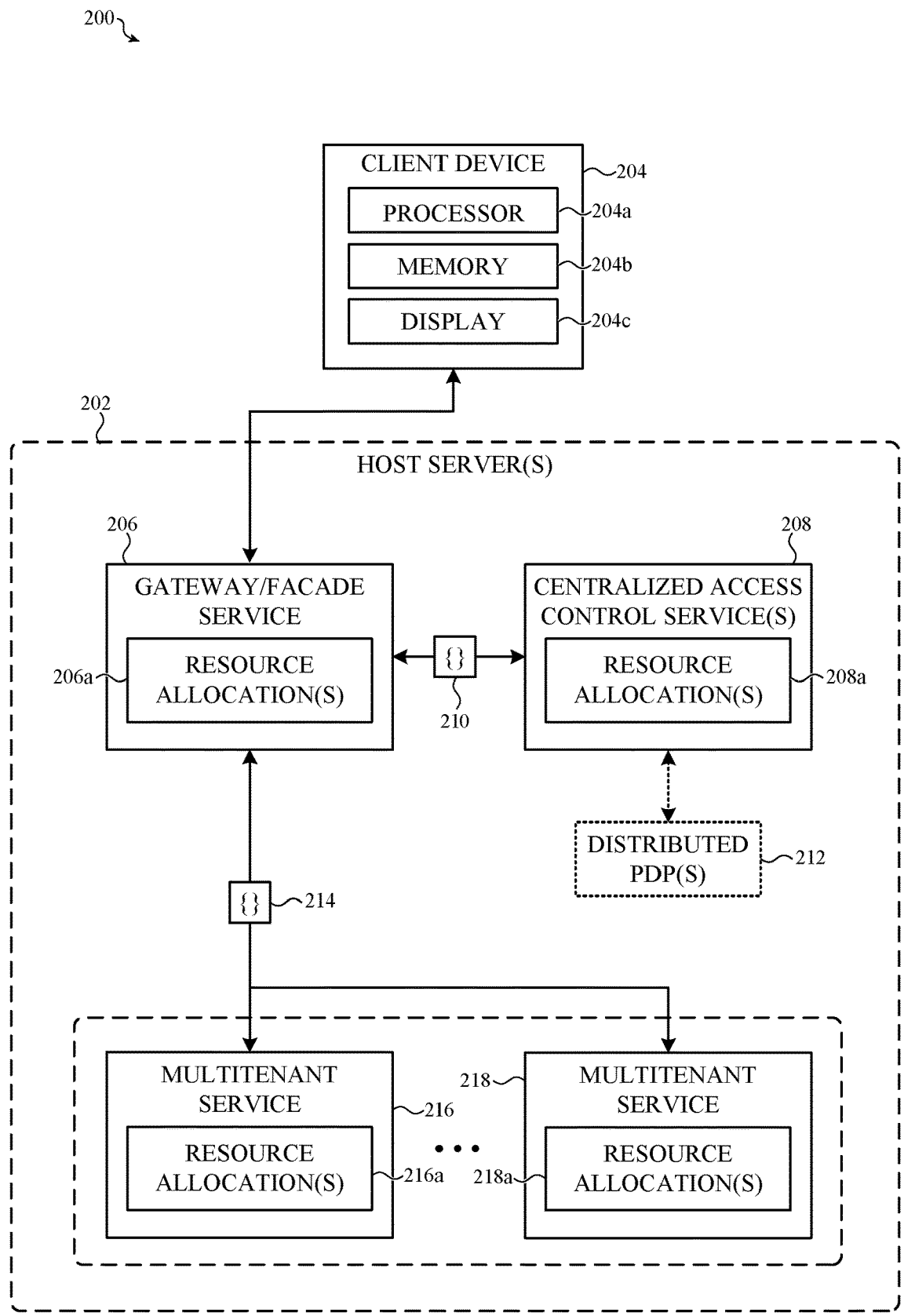
FIG. 2 shows an example of a collaborative work environment that may be used to perform user authentication for web based services using a centralized access control system.

FIG. 2 shows an example of a collaborative work environment 200 that may be used to perform user authentication for web based services using a centralized access control system. For simplicity of illustration, the embodiments that follow reference an example construction in which an organization is a tenant of multiple discrete multitenant services that can be leveraged by employees of the organization to advance a common goal.

The collaborative work environment 200 may be used to initiate cookie creation for a browser accessing content from one or more services hosted by a backend system. For example, the collaboration work environment 200 may allow a user to access multiple different accounts, associated with different permissions, to sign into services of the collaborative work environment without needing to individually sign into a service or service(s) for each user account.

It may be appreciated that multitenant services are (e.g., platform as a service, software as a service, data as a service, and so on) are merely one example of software configurations that can leverage methods and systems described herein. In particular, it may be appreciated that licensed software, single-tenant software, and/or self-hosted software tools can likewise implement systems and methods, and leverage benefits therefrom, such as described herein.

Accordingly, because a person of skill in the art will readily appreciate how permissions management techniques described herein can be equivalently applied to many software systems and data architectures, examples that follow reference only multitenant system architectures (e.g., systems leveraging one or more multitenant services for collaboration purposes) for simplicity of description.

Example services that can be architected as multitenant services in which different tenants' content is isolated from one another may include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular multitenant service, including multimedia data such as images, audio files, or videos, can be considered user-generated, content as described herein.

In the illustrated example, the collaborative work environment 200—which is merely one example of an architecture such as described herein—includes a host server 202 that communicably couples via one or more networking or wired or wireless communication protocols to a client device 204. It may be appreciated that other client devices may be configured in a substantially similar manner as the client device 204, although this may not be required of all embodiments and different client devices can be configured differently and/or may transact data or information with, and/or provide input(s) to, the host server 202 in a unique or device-specific manner.

The client device 204 can be any suitable personal or commercial electronic device and may include, without limitation or express requirement, a processor 204a, volatile or non-volatile memory (identified, collectively, as the memory 204b), and a display 204c. Example electronic devices include, but are not limited to: laptop computers; desktop computers; cellular phones; tablet computing devices; and so on. It may be appreciated that a client device 204, such as described herein (e.g., electronic device 600), can be implemented in any suitable manner.

In many embodiments, the processor 204a of the client device 204 can be configured to execute one or more software applications (each referred to as "client applications") stored, at least in part, in the memory 204b. Each respective client application can be instantiated by the processor 204a. In particular, the processor 204a may access a persistent memory (e.g., of the memory 204b) to retrieve one or more executable binary files and/or other computer-executable instructions (collectively, "assets"). The processor 204a thereafter can load at least a portion of the retrieved assets into a working memory (e.g., of the memory 204b), thereby at least partially instantiating the respective client application. For simplicity of description an implementation in which the client device 204 is configured to execute/instantiate a single client application is described below.

In embodiments, the host server 202 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host server 202 may be a cluster of different computing resources, which may be geographically separated from one another. In this manner, generally and broadly, both the host server 202 and the client device 204 can be referred to, simply, as "computing resources" that are communicably coupled to one another via a suitable network connection.

The host server 202 and the client application supported/executed by the client device 204 are communicably coupled via a suitable network connection which may be wired, wireless, or a combination thereof. In some examples, the network connection may include the open Internet.

In other cases, the network connection coupling the host server 202 and the client application may include only a private intranet managed by, or otherwise utilized by, an organization such as referenced above. The host server 202 and the client application can communicate according to any suitable protocol, form, or format. In many examples, the host server 202 at least partially exposes an API that can be accessed by the client application to perform one or more functions. For example, the client application may leverage the API to request tenant content (such as described herein) from the host server 202.

For simplicity of description, the embodiments that follow reference a configuration in which the host server 202 and the client application are configured to communicate and transact information according to a REST API, but it may be appreciated that this is merely one example and in other embodiments other signaling, communication, or data transaction methodologies may be used.

The host server 202 of the collaborative work environment 200 can be configured and/or implemented in a number of suitable ways. For example, in many embodiments the host server 202 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the host server 202, such as a gateway service 206.

The gateway service 206 can be hosted by a virtual machine or container executing over physical or virtual resources of the host server 202; collectively the physical and/or virtual resources allocated to instantiate the gateway service 206 are identified in the figure as the resource allocation(s) 206a. As with other embodiments described herein, the resource allocation(s) 206a can include, but may not be limited to (or may not require) one or more of: a processor; a memory; non-volatile storage; networking connections; and the like.

For example, in many constructions, the gateway service 206 is implemented in whole or in part as a software instance. The software instance defining the gateway service 206 may be instantiated by a processor among the resource allocation(s) 206a. In particular, the processor may access a persistent memory to retrieve one or more executable assets. The processor thereafter can load at least a portion of the retrieved assets into a working memory, thereby at least partially instantiating the gateway service 206.

In some embodiments, the gateway service 206 may be provided as a serverless function (e.g., a lambda function), may be provided as a reverse proxy, may be provided as a router or as any suitable software and/or hardware appliance configurable to communicably couple at least to the client device 204 and to service requests for information therefrom, such as requests for tenant content, such as described herein.

In other implementations, although not illustrated, the gateway service 206 may be executed/instantiated separately from the host server 202 altogether.

As noted with respect to other embodiments described herein, the gateway service 206 can be configured to receive requests and serve responses specifically related to tenant content created within an environment defined at least in part by a multitenant software service. Such requests for tenant content may include requests for permissions validation and/or may automatically trigger one or more permissions compliance operations. In some cases, the gateway service 206 may also be configured for authentication operations, but for simplicity of description the embodiments that follow reference only permissions based decision-making.

An example multitenant service is a project management service. In this example, tenant content may be a task list attributed to, or otherwise associated with, a particular user of the project management service. At some instant, the user-having been previously authenticated by a service such as a single sign-on service or other credential verification service—may operate the client device 204 to initiate a request intended to be received by the project management service to retrieve the task list.

After the authenticated user of the client device 204 is determined to be authorized to view the task list, a copy of the task list can be transmitted via a suitable channel in a suitable format, via the gateway service 206 to the client device 204 for rendering in a graphical user interface defined by the client application and displayed on the display 204c. More particularly, in this example, the gateway service 206 interposes the project management service and the client application, routing authorized and policy-compliant requests for tenant content (e.g., the task list) originating from the client application, to the project management service.

As understood by a person of skill in the art, as a part of servicing this request from the client device 204, the gateway service 206 can determine whether the already-authenticated user currently using the client device has permission to access the requested tenant content, in this case, the task list.

More specifically, the gateway service 206 can be configured to communicably couple to a centralized access control service 208, which maintains one or more internal databases and/or maintains access to one or more external databases storing one or more policy documents and/or policy-as-code codebases.

The policy documents/code may be at least partially executable and/or readable by the centralized access control service 208 which, in turn, can receive as input some identifier (herein a "user identifier") associated with the authenticated user, such as a user identifier, a user account identifier, and/or session identifier associated with the client device and so on. In addition, the centralized access control service 208 can receive as input some identifier (herein, a "content identifier") associated with and/or identified the content being requested by the authenticated user, in this case, the task list. In other cases, a "feature identifier" may take the place of a "content identifier" herein, referring instead of content, to a feature or functionality of a software platform. As one example, a feature identifier may reference an ability of a messaging platform to send and/or receive a message.

The content identifier and the user identifier can be used to generate a query of one or more of the policy documents/code objects instantiated by the centralized access control service 208, which in turn can be configured to generate a Boolean (or other) output indicating whether the authenticated user is permitted, according to one or more policy documents/code, to access the requested content. This response, referred to herein as an "authorization response," can be transmitted by the centralized access control service 208 back to the gateway service 206 as the authorization response 210.

In some cases, as noted above, the centralized access control service 208 can be implemented as a distributed system, in which one or more partial or complete instances of at least a portion of the centralized access control service 208 are instantiated in particular geographic locations and/or according to some desired parameter. In FIG. 2, optional distributed policy decision points are identified as the distributed policy decision points 212. Upon determining that the authenticated user is permitted to access the task list, the gateway service 206 can return to the client device 204 the task list formatted in a format requested by and/or expected by the client device 204. It may be appreciated that this is merely one example construction, and that in other examples multiple policy decision points may be separately and/or differently configured to service different policy requests and/or authorization requests related to specific products, specific tenants, specific geographies, and so on.

In another example, a multitenant service may be a project management service. In this example, tenant content may be a set of documentation detailing one or more projects attributed to or otherwise associated with a particular user of the project management service.

At some instant, the user may operate a graphical user interface rendered on the display 204c by the client application to initiate a request intended to be received by the project management service to retrieve the set of documentation detailing a selected project; each document of the set may be a separate tenant content item. In some examples, each paragraph of each document may be separate tenant content objects/items. As with other examples described herein, it may be appreciated that any suitable In this example, as with others described herein, the gateway service 206 interposes the project management service and the client application, routing the request for tenant content originating from the client application to the project management service.

As with the preceding example, as a part of servicing this request, the gateway service 206 can determine whether an authenticated user currently using the client device has permission to access the requested tenant content. Upon determining that the authenticated user is permitted to access the requested tenant content (by communicating with the centralized access control service 208 and receiving an authorization response 210), the gateway service 206 can return to the client device 204 the requested information, formatted in a format requested by and/or expected by the client device 204.

In further examples, as described above, a single collaborative work environment, such as the collaborative work environment 200, may leverage a number of discrete services which may or may not be supplied by the same vendor.

For example, an organization may be a tenant of a messaging service, a project management service, an issue tracking service, a directory service, an email service, a telephony service, and a code repository service—each of which may define an environment in which a user of that service can create and consume tenant content specific to each individual service or tool.

In these examples, the client application may be operated at some instant by a user to obtain a message from the messaging service, obtain information about a project form the project management service, add an issue to the issue tracking service, obtain contact details for a colleague leveraging the directory service, send an email to that colleague via the email service, receive a voice message from that colleague via the telephony service, and submit a pull request to the code repository service.

In these examples, as may be appreciated, the gateway service 206 can be configured to route each respective request from the client application to each appropriate intended recipient/endpoint service after permissions for the request have been verified by the centralized access control service 208 issuing an authorization response 210. In particular, authorized tenant content requests related to messaging are routed to the messaging service, authorized tenant content requests related to email are routed to the email service, authorized tenant content requests related to telephony are directed to the telephony service, and so on. In these examples, if a particular request is not authorized, the intended targeted software platform may not be invoked at all; the request may simply be blocked by the gateway service 206, thereby saving bandwidth and resource utilization of the intended targeted software platform for servicing authorized requests only.

In view of the foregoing examples, each of which may be associated with—and/or dependent upon—one or more permissions verification operations, it may be appreciated that, generally and broadly, the client application executed/instantiated by the client device 204 may be purpose configured to communicate with a particular multitenant service. More specifically, the client application may be configured to communicate with the multitenant service according to a particular API defined by that multitenant service by submitting an API request and/or response, identified in FIG. 2 as the API request 214. In the illustrated example, two example multitenant services are illustrated with which the client application(s) instantiated by the client device 204 may communicate.

A first multitenant service is identified as the multitenant service 216 and a second multitenant service is identified as the multitenant service 218.

As with other computing resources described herein, the multitenant service 216 and the multitenant service 218 can be hosted by a virtual machine or container executing over physical or virtual resources; collectively the physical and/or virtual resources allocated to instantiate the multitenant service 216 and the multitenant service 218 are identified in the figure as the resource allocation(s) 216a, 218a, respectively. The resource allocation(s) 216a, 218a can include, but may not be limited to (or may not require) one or more of: a processor; a memory; non-volatile storage; networking connections; and the like For example, in many constructions, each of the multitenant service 216 and the multitenant service 218 is implemented in whole or in part as a software instance of which the organization is a tenant. Each respective software instance defining each of the multitenant service 216 and the multitenant service 218 may be instantiated by a processor allocation. In particular, the processor allocation may access a persistent memory to retrieve one or more assets. The processor thereafter can load at least a portion of the retrieved assets into a working memory, thereby at least partially instantiating the multitenant service 216 and the multitenant service 218.

In these examples, the gateway service 206 of the host server 202 can be configured to route requests (herein "API requests") from one or more client applications executing on the client device 204 (conforming to endpoint-specific APIs) to either of the multitenant service 216 and the multitenant service 218. In some cases, the gateway service 206 is configured as a pass-through, whereas in others, the gateway service 206 may be configured to modify requests submitted from client applications and intended to be received by multitenant applications. The gateway service 206 can identify and/or predict an appropriate endpoint using any suitable method including, but not limited to: request format; request content; request header tags; domains, subdomains, or URLs to which the request is directed; and so on. It may be appreciated that these foregoing examples are not exhaustive of the ways by which the gateway service 206 may route signals and/or may make determinations in advance of, or otherwise to inform, routing signals to various multitenant services.

In the illustrated embodiment, the API request 214 is routed by the gateway service 206 to one of the multitenant service 216, 210 after having determined that the request is authorized by communicating, as described above, with the centralized access control service 208.

These foregoing embodiments depicted in FIG. 2 and the various alternatives thereof and variations thereto are presented, generally, for purposes of explanation, and to facilitate an understanding of various configurations and constructions of a centralized access control service (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
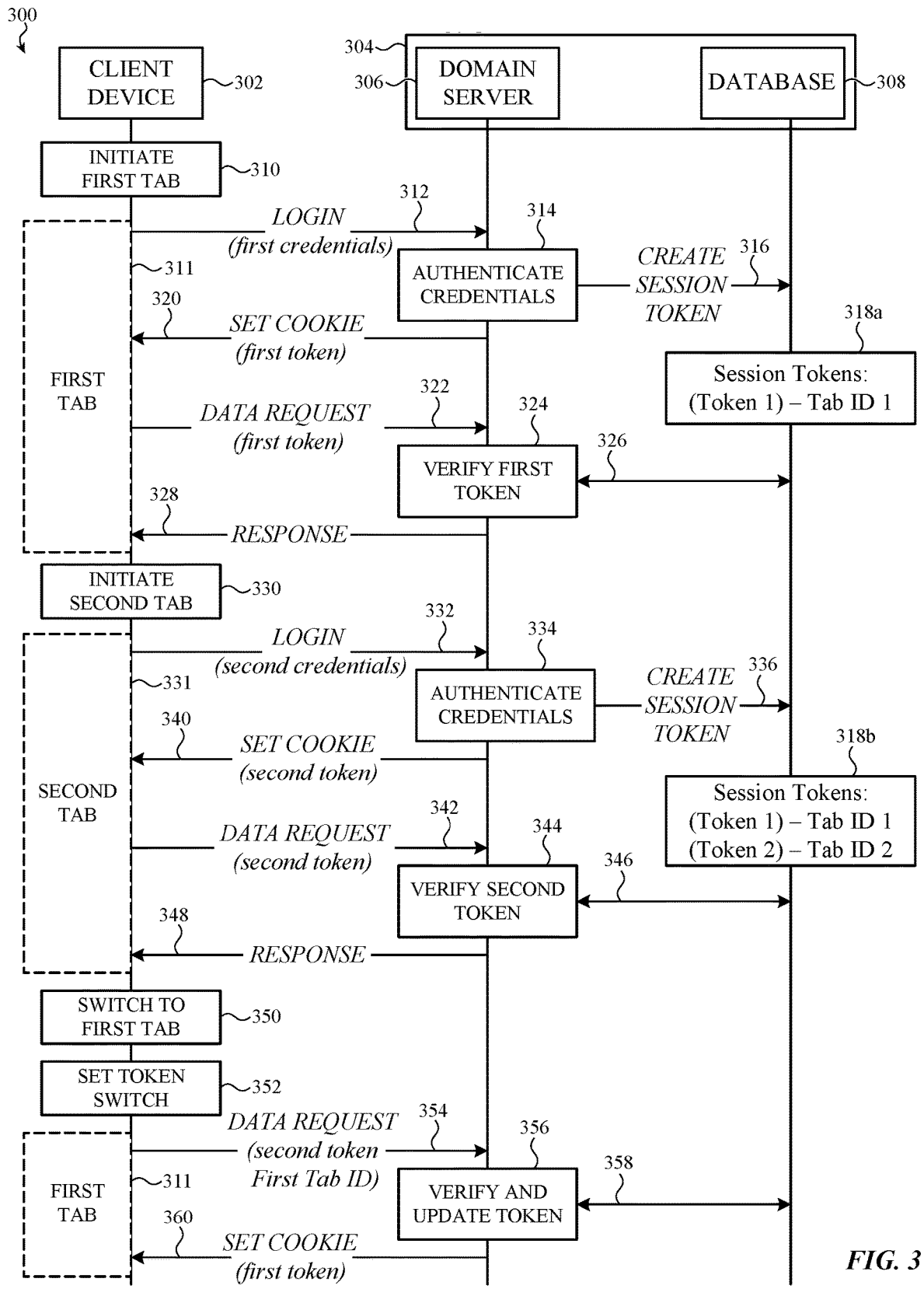
FIG. 3 shows an example process flow for hosting secure content between a backend service and a client device.

FIG. 3 shows an example process flow 300 for hosting secure content between a backend service 304 and a client device 302. The process 300 can be performed by the systems and devices described herein. The backend service 304 can include a domain server, 306 which can be an example of the servers described herein (e.g., host server 102) and a database 308.

At operation 310, the client device 302 can initiate a first tab 311 in a browser application operating on the client device 302. The first tab 311 can be initiated in any suitable way including in response to opening a browser application, in response to a user input to a browser application and so on. The example provided herein is described in the context of browser tabs, however, these concepts can readily be applied to other view profiles for a browser such as switching between different browser windows and/or other graphical interfaces associated with a session between a browser application and backend system, as described herein.

At operation 312, the browser application can send first login information (and/or other authentication information) to the domain server 306. Sending the first login information to the domain server 304 may be in response to the browser application sending a request for content to the domain server 306 and the domain server 306 determining that there is not an active session for a user account associated with the first tab 311. Accordingly, the domain server 306 may cause the browser application to prompt the user for first login credentials. The first login credentials can include a username and password for a first user account (or other information used to login to a service) associated with the first tab 311. The browser application may send the first credentials (e.g., unique identifier and password and/or other information used to verify the user account) to the domain server 306 for authentication.

At operation 314, the domain server 306 may authenticate the first credentials and create a first session token that can be used by the browser application to request content for the first user account from the domain server 306. The domain server 306 can authenticate the first user credentials using any suitable process. In some cases, centralized access control service (e.g., described with reference to FIG. 2) can be used to authenticate the user credentials.

At operation 316, the domain server 306 can store a first session token at the database 308. The first session token may be stored in a record 318a at the database. In some cases, the login information received at operation 312 from the client device can include a first temporary account identifier which can be a unique identifier associated with the user account for the first tab 311 (e.g., the first user account). The record 318a can include an association between the first session token (e.g., Token 1) and the first temporary account identifier (e.g., Tab ID 1).

A temporary account identifier can be an identifier that is used to associate a browser tab with a user account session hosted by the backend system. A temporary account identifier can include a session identification for the tab that is associated with an access token or other access credential for the corresponding user account. In some cases, the temporary account identifier can include a hashed value, which may be based on a session identification, user account identification or other suitable information.

At operation 320 and in response to authenticating the user and generating the first session token, the domain server 306 can cause the browser application to store a session cookie at the client device 302. The session cookie can be stored using a SET Cookie command or any other suitable process. The session cookie can include the first session token, which can be used by the client device 302 to access content, using permissions associated with the first account, and from the domain server 306. In cases, where a session cookie has been stored at the client device, operation 302 may include modifying the stored session cookie to include the access information (e.g., a session token) associated with the first user account. In these examples, the access information for the first user account may be appended to the session cookie, used to replace the current access information, and/or otherwise used to modify the session cookie.

At operation 322, the browser application may request data from the domain server 306 and the request can include the first session token. The data request may be in response to user interaction with content displayed in the first tab 311 and/or in response to other processes that are used to support the first session at the first tab 311.

At operation 324, the server 306 can verify that the first session token is valid, which may include accessing the record 318a and/or other session data from database 308 at operation 318a. In response to verifying that the first session token is valid, and that the first session has not expired, the domain server 306 may send a response at 328 including data/content for the browser application, which may be used to update the first tab 311. The response 328 may include data/content that is passed on the access level/role associated with corresponding user account. In response to determining that the first session token is invalid and/or that the first session token has expired, the response at operation 328 may include an indication of the invalid token, the expired session and/or cause the browser application to prompt the user for user credentials (e.g., the first user credentials).

At operation 330, the client device 302 can initiate a second tab 331 in the browser application operating on the client device 302. The second tab 331 can be initiated in any suitable way including in response to opening a browser application, in response to a user input to a browser application and so on.

The second tab 331 may be initiated to access content from the same service backend 304 as the first tab 311. Accordingly, the first tab 311 session and the second tab 331 session may use information from the same session cookie to access data/content from the domain server 306. However, the first tab 311 session may be associated with a first user account and first session token, and the second user tab may be associated with a second user account and a second session token. Accordingly, process 300 may include procedures for updating the session cookie with the appropriate session token for the displayed/selected tab.

At operation 332, the bowser application can send second login information (or other authentication information) to the domain server 306. Sending the second login information to the domain server 306 may be in response to the browser application sending a request for content to the domain server 306 and the domain server 306 determining that there is not an active session for a user account associated with the first tab 311. Accordingly, the domain server 306 may cause the browser application to prompt the user for login credentials. The login credentials can include a username and password for a second user account (e.g., second credentials) associated with the second tab 331. The browser application may send the second credentials to the domain server 306 for authentication.

At operation 334, the domain server 306 may authenticate the second credentials and create a second session token that can be used by the browser application to request content for the second user account from the domain server 306. The domain server 306 can authenticate the second user credentials using any suitable process. In some cases, the centralized access control processes as described herein (e.g., with respect to FIG. 2) can be used to authenticate the user credentials.

At operation 336, the domain server 306 can store a second session token at the database 308. The second session token may be stored in the record 318 at the database. In some cases, the login information received at operation 332 from the client device 302 can include a second temporary account identifier which can be a unique identifier associated with the second user account for the second tab 331 (e.g., the second user account). The record 318 can be updated to include a second association between the second session token (e.g., Token 2) and the second temporary account identifier (e.g., Tab ID 2), which may be in addition to the first association.

At operation 340 and in response to authenticating the user and generating the second session token, the domain server 306 can cause the browser application to update the session cookie at the client device 302. The session cookie can be updated using a SET Cookie command or any other suitable process. The session cookie can be updated to include the second session token, which can be used by the client device 302 to access content, based on an access level/role associated with the second account, and from the domain server 306. In some cases, updating the cookie with the second session token can include overwriting or otherwise removing the first session token from the session cookie. The session cookie can include the association between the second tab session and the first tab session, which may be used by the browser application to verify that the second tab session has permission to request the update to the session cookie when switching between tab sessions. For example, the session cookie may include a series of key-value pairs or other formatting schema that includes, inter alia, both a first key-value pair designating the current session id, which may be treated as the primary key-value pair or session id, and a secondary or associated key-value pair that includes the other session id, which may be treated as an "associated" session. In response to switching between the two different tabs or sessions, the new cookie may be drafted such that the previously current session id is recorded in a secondary key-value pair and the previously other or associated session is recorded in the primary key-value pair. Such an alternating scheme in a rewritten cookie may be performed each time the tabs or sessions are switched. A similar scheme may be employed for more than two sessions in which the current session is stored as a primary key-value pair or entry and the other (inactive) sessions are stored as secondary, tertiary, and other key-value pairs or entries.

Additionally or alternatively, the domain server can store an association between the second tab session and the first tab session, which may be used to verify a request to update the session cookie with the corresponding session token in response to a tab switch from one tab session to another tab session (e.g., from the second tab session and to the first tab session). Each time a user switches from one tab session and to a new tab session, the backend service 304 can create an association between the tab sessions, which can be used as permission to update the session cookie with the corresponding session token in response to switching between the different tab sessions. For example, the domain server 306 can update/rewrite the session cookie to include an identifier for the first tab 311 and/or the first user account associated with the first tab 311. In some cases, this can be the session token for the first user account that is stored as part of the session cookie, but not used by the second user account to request data from the domain server.

At operation 342, the browser application may request data from the domain server 306 and the request can include the second session token. The data request may be in response to user interaction with content displayed in the second tab 331 and/or in response to other processes that are used to support the second session at the second tab 331.

At operation 344, the server 306 can verify that the second session token is valid, which may include accessing the record 318 and/or other session data from database 308 at operation 318b. In response to verifying that the second session token is valid and that the second session has not expired, the domain server 306 may send a response at 348 including data/content for the browser application, which may be used to update the second tab 331. The data/content may be based on an access level/role assigned to the user and defined permissions levels for the data/content. In response to determining that the second session token is invalid and/or that the first session token has expired, the response at operation 348 may include an indication of the invalid token, the expired session and/or cause the browser application to prompt the user for user credentials (e.g., the first user credentials).

At operation 350, the browser application may receive a request to switch from the second tab 331 and back to the first tab 311. The request may be in response to the client device 302 determining a user interaction with the browser application selecting the first tab 311 or otherwise indicating a view change from the second tab 331 and to the first tab 311. For example, the browser application and/or backend service 304 may detect a visibility change event, a user input to the browser application, and/or other events that result in transitioning from interacting with the second tab 331 to interacting with the first tab 311.

The request to switch from the second tab 331 and to the first tab 311, can include the association between the second tab session and the first tab session. For example, if the first session token is stored as an association in the session cookie, the browser may send the first session token to the backend service 304 as part of the switch request. The backend service 304 can use this association to verify that the first tab session has permission to update the session cookie with the first session token and/or other information related to the first tab session 311. Accordingly, in some cases and in response to determining that the first tab session has permission to update the session cookie, the backend service 304 can updated the session cookie to include the first session token to be used by the first tab session to access content and include in the session token the second session cookie (as an inactive cookie for the first tab session), which can be used by browser to update the session cookie in response to a request to switch back to the second tab session. Accordingly, the different session tokens can be switched from an active token, used to access content for a user account associated with a tab, and a dormant session token used as permission to update the session cookie when switching to a different tab session.

In some cases, the stored association between the first tab (e.g., corresponding to the first user account) and the second tab (e.g., corresponding to the second user account) can be delinked. For example, the backend service 304 may automatically generate the association between the first tab and the second tab as part of the process of instantiating the second user account at the second tab. In some cases, the backend service 304 may provide an option for the user to remove the association between the first tab and the second tab. Accordingly, if the association is removed, and a user transitions between the first tab and the second tab (or between the second tab and the first tab) the backend service may not automatically update the session cookie. In some case, the associations between tabs may expire after a defined duration, which can result in the associations between tabs being removed.

At operation 352 and in response to determining a view change request from the second tab 331 and to the first tab 311, the client device 302 may initiate a set token switch 311. The set token switch procedure can be used to update the session cookie with the first session token. As part of the set token switch, the browser application may send a data request to the domain server 306 at operation 354. The data request may include a request for data associated with the first user account, which is associated with the first tab. The data request may also include the second session token, which is currently stored at the session cookie and the first temporary account identifier associated with the first user account.

At operation 354, and as part of the set token switch process, the domain server 306 may recognize that the second session token is not the correct token for the first tab 311 session. The domain server 306 may be configured to use the first temporary account identifier, sent in the data request 354 as part of the set token switch process, to verify and update the session token.

At operation 356, the domain server 306 may communicate with the database using one or more communications 358, which may be used to determine that the first temporary account identifier is stored in the record 318 and associated with the first session token. If the domain server determines that the first session token is still valid, the domain server 306 may cause the browser application to update the session cookie with the first session token at operation 360. Causing the browser application to update the session cookie may be performed using a SET Cookie command that includes the first session token and/or using any other suitable procedure that replaces, updates, or otherwise modifies the session cookie. Accordingly, in response to the browser application determining a view change between from the second tab and to the first tab, the session cookie can be updated to include the corresponding first session token, which allows the browser to access data/content from the domain server using the permissions associated with the first user account.

Additionally or alternatively, the domain server can update the session cookie to include an association between the first tab session and the second tab session, which may be used to verify that a second tab has permission to update the session cookie with the corresponding session token.

Updating the session cookie can be done automatically, in response to determining a view change from the second tab and to the first tab. For example, automatically updating the session cookie may not require user input. Additionally or alternatively, switching between different tabs associated with different accounts can cause the content/session of the account that is not being viewed to become dormant or paused such that content on the elevated tab is not updated.

As the browser detects selections of different tabs associated with different accounts at the domain server, the set token switch processes can be performed to update the session cookie with the corresponding session token for an account associated with a selected tab. In some cases, as the browser detects selections of different tabs associated with different accounts at the domain server, updates to the browser application (e.g., content, data, displaying of information, and/or other processes performed by the browser application and/or backend system) may be paused while the session cookie is updated. Accordingly, as a user changes between different browser tabs logged into a domain each tab with a different account, the set token switch processes, can ensure that the session token used to access data from the service backend 304 is the session token associated with the selected browser tab.

In some cases, when a session cookie is updated and/or rewritten as part of switching between tab session associated with different user accounts, the system may also rewrite other cookies associated with a particular user account. For example, a backend service may store various cookies such as an analytics cookie, shopping cart cookie and so on. As part of the process of updating a session cookie, the backend service may copy/take a snapshot of these other cookies (e.g., analytics cookie, shopping cart cookie, and so on) and store them at the backend service 304. When the browser requests to return back to the tab session with stored cookies, the backend service 304, may retrieve these stored cookies and cause the browser application to rewrite them to the client device as part of the tab session switch procedure. Accordingly, as a user switches between tab session, other data associated with that session such as analytics data, shopping cart data stored in these cookies can also be restored.

Figure 4:
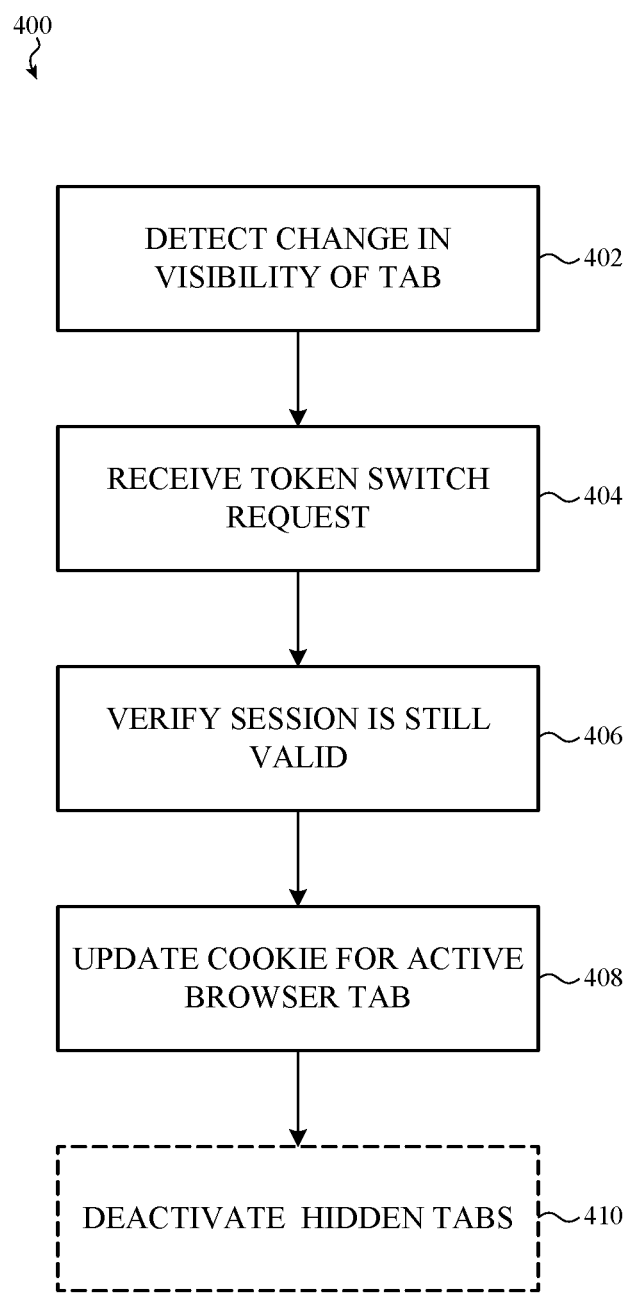
FIG. 4 shows an example process for hosting secure content between a host service and a client device.

FIG. 4 shows an example process 400 for hosting secure content between a host service and a client device. The process 400 can be performed by the devices and systems described herein.

At operation 402, the process 400 can include detecting a change in visibility of a browser tab at browser application operating on a client device. The browser application can include a first tab that is associated with a first session between the browser application and a backend service using a first user account and a second tab that is associated with a second session between the browser application and the host service using a second account. The first and second tabs may be instantiated as described herein (e.g., using process 300). The examples provided herein are in the context of a first browser tab session logged into a backend service using a first account and a second browser tab session logged into the backend service using a second user account, however it will be appreciated that these processes can apply to additional browser tab (or browser window) sessions that are logged into a service using a different user account from the other tab sessions.

The change in visibility can be detect by the client device in any suitable way, including a user interaction (e.g., selection) of the first browser tab session, while the second browser tab session was active. The user interactions may include mouse clicks, keyboard commands or other inputs to the client device.

At operation 404, the process 400 can include initiating a token switch request, in response to detecting the change in visibility tab. The token switch request can be used by the browser application to indicate to the backend service that the browser application is switching between a first tab session associated with a first user account and a second tab session associated with a second user account, and that the a session token stored in the session cookie may need updating so that it corresponds to the appropriate user account. Accordingly, in response to receiving a session token from the browser application that does not match a selected tab session, the service backend can process the request to identify and/or verify that an active session token exists for the selected browser session and update the session cookie to include that token.

For example, a browser application may currently be displaying the second tab session and the session cookie may include a second session token that is associated with a second user account for the backend service. In response to the user selecting a first tab session on the browser application, the browser application may send a token switch request to the backend service indicating that the session cookie will need to be updated. The token switch request may include a temporary account identifier that identifies a user account associated with first tab session. In some cases, the browser may store temporary account identifiers for each tab session in local memory at the client device, which may be temporarily stored for the duration that a corresponding browser tab session is active.

The backend service may also store a record(s) that associates each temporary account identifier with a session token for the corresponding user account. Accordingly, in response to receiving the token switch request and the temporary account identifier, the backend service may reference the received temporary account identifier against its stored record to determine if the temporary account identifier is associated with a session token.

At operation 406, the process 400 can include verifying that the session token associated with the received temporary account identifier is still valid. For example, by determining that an expiration condition for the session token has not been satisfied.

Additionally or alternatively, as part of receiving the token switch request at operation 404, the backend service may receive the second, active session token from the browser application. In this example, the second session token may be the token that is currently stored in the session cookie and associated with the tab session that the user is switching from. The backend service may verify this second session token as a security measure to make sure the token switch request is from the browser application and associated with a currently valid session.

At operation 408, the process 400 can include causing the browser application to update the session cookie with the first session token, which is associated with the first tab which has been selected by the user. For example, in response to determining that the first session cookie is still valid, the service backend may perform a SET Cookie (or similar procedure) that causes the session cookie to be updated with the first session token.

In some cases, causing the browser to update the session cookie with the corresponding session token may be performed automatically as part of the token switch process. In other cases, the browser may prompt the user and/or request an input from the user to confirm that they session cookie should be updated with the corresponding session token.

In response to updating the cookie the browser application may display a graphical element that indicates that the user account has been changed to a user account corresponding to the selected tab. The graphical element can be displayed in the correspond browser tab and/or as any other suitable alert in the browser application.

At operation 410, the process 400 may include deactivating background updates to the other tabs which are not associated with the current user account information stored in the session cookie (e.g., unselected/hidden browser tabs). For example, in some cases a browser application may attempt to retrieve information for unselected/hidden other tab sessions as background updates. However, since the session cookie includes user credentials (a session token) that is associated with the currently selected/active browser tab, background updates may attempt to use these credentials stored in the session cookie even though they are not associated with a user account corresponding to the deactivated tab. Accordingly, pausing updates to hidden tabs may help prevent validation and/or data tracking issues that may occur.

In some cases, a session cookie can be periodically switched/updated, for example, to allow hidden, paused/dormant tab session to update content in the background. For example, if a first tab is selected and active, the session cookie can include the session token (or other access credentials) for the user account associated with the active browser tab. In some cases, the browser and/or backend service may temporarily update the session cookie with a session token (or other access credentials) associated with a different tab and user account. This temporary update may be done without the user switching between tabs or in response to other user input, and instead initiated by the browser application and/or backend server. This may allow the other/inactive tab to update content using the assess token associated with that tab and user account. After the other/inactive tab has performed the update, in response to a certain time elapsing or other defined procedure, the session cookie may be automatically updated with the access token corresponding to the active tab and user account. This may allow the browser application to multi-thread/share the session cookie between multiple different tabs and associated user accounts, which may allow the inactive/dormant tabs to be periodically updated.

Figure 5A:
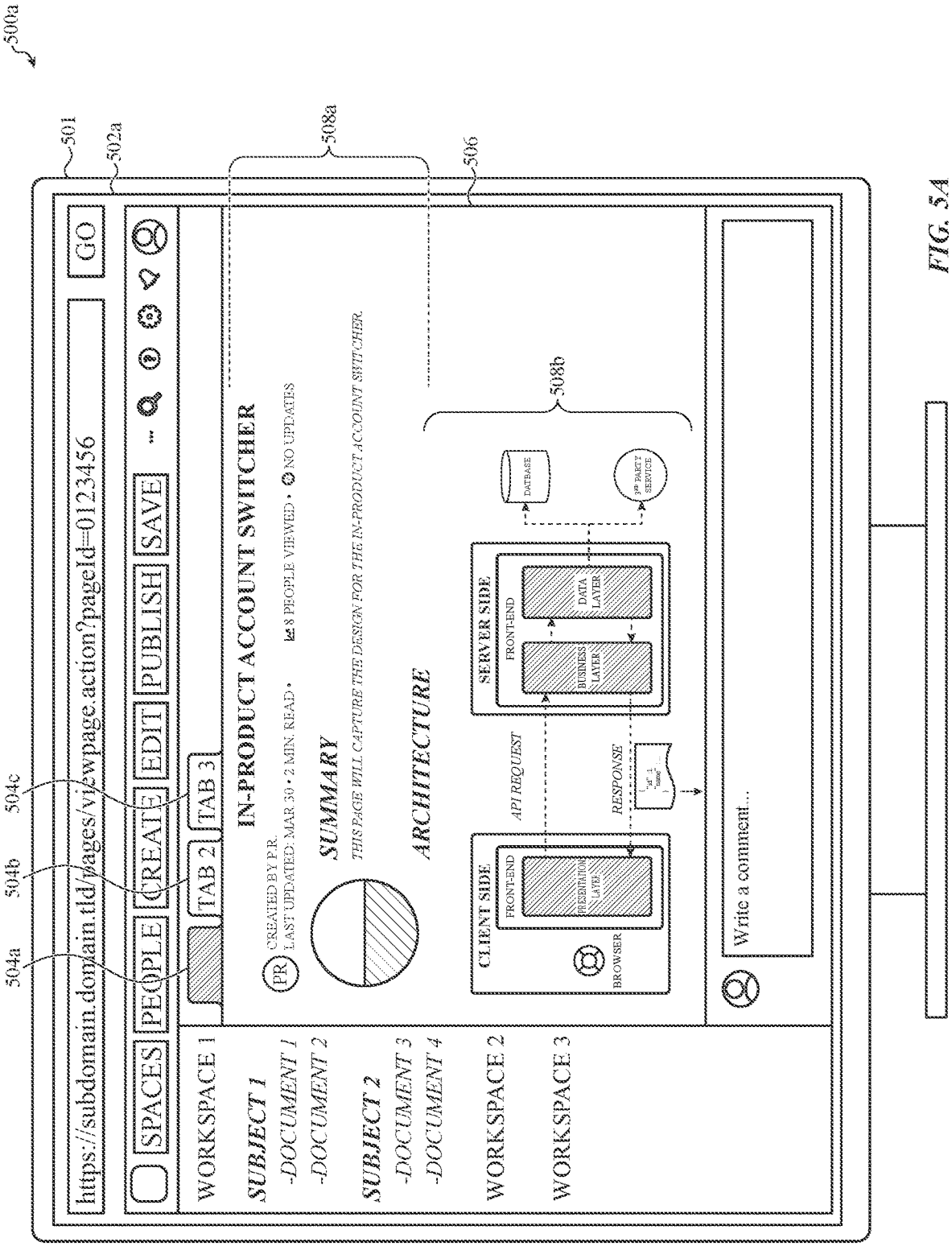
FIGS. 5A-5C show example user interfaces that can be implement for hosting secure content between a host service and a client device.
Figure 5B:
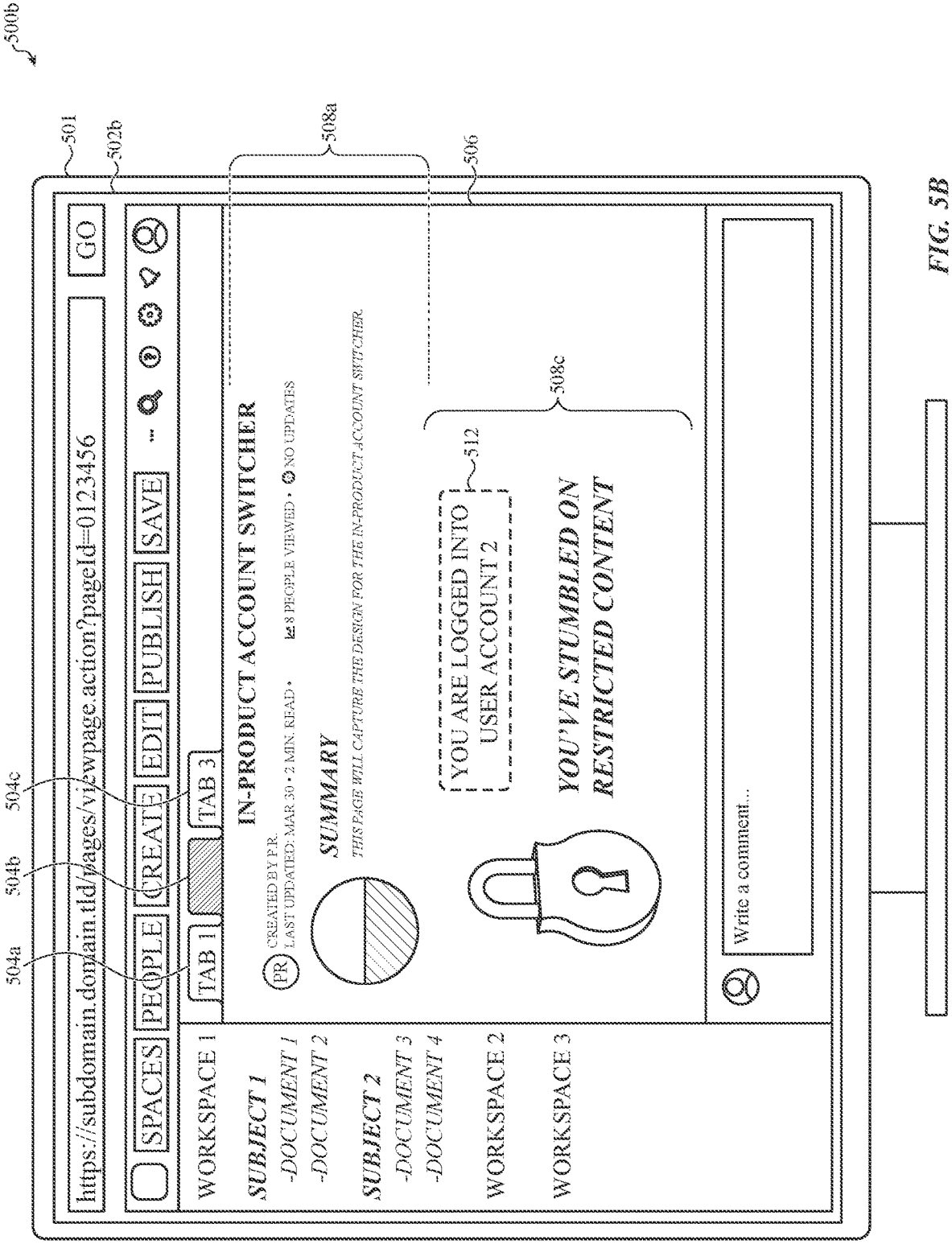
Figure 5C:
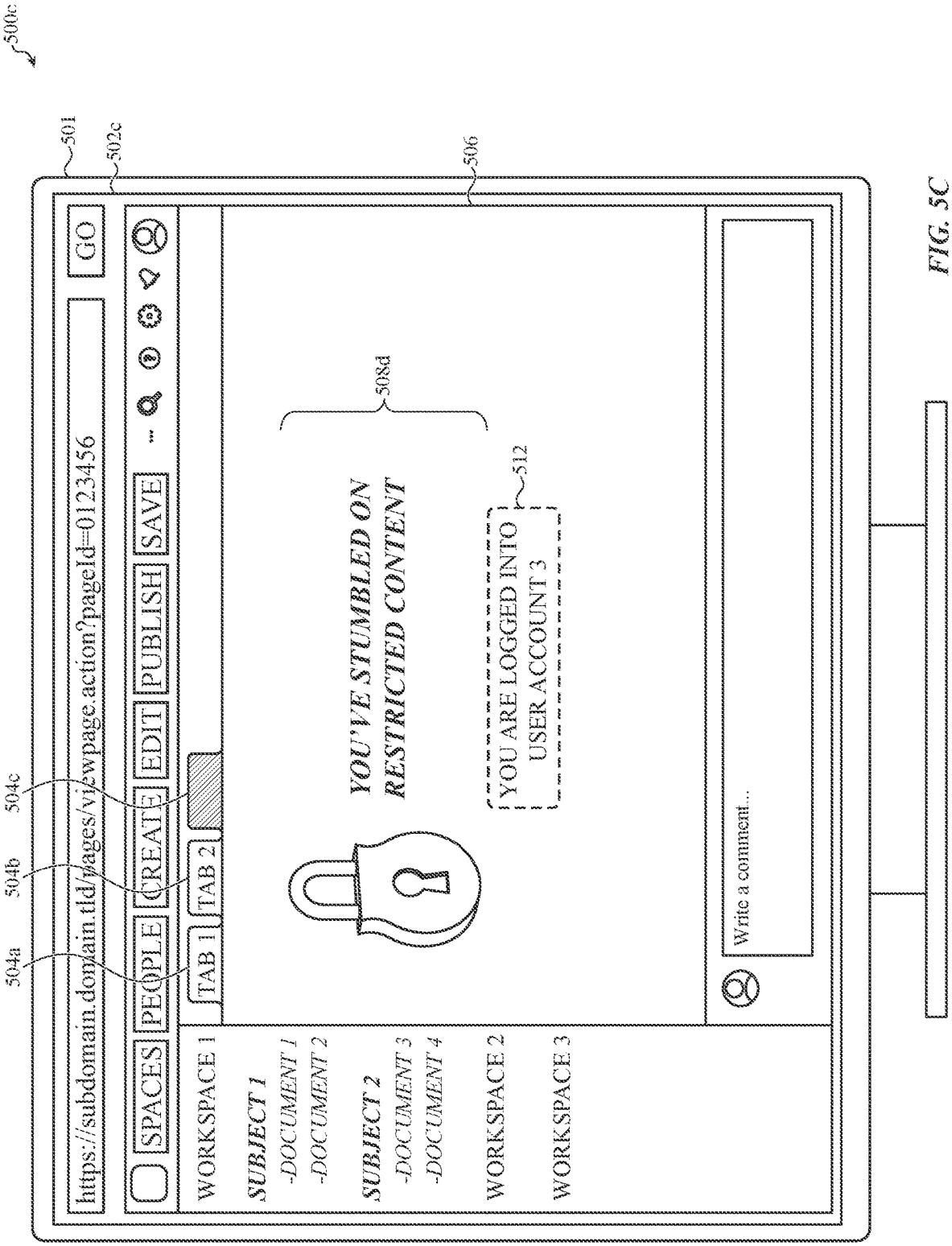

FIGS. 5A-5C show example user interfaces 500 that can be implement for hosting secure content between a host service and a client device as described herein. The user interfaces may be generated by a browser application operating on a client device 501 an include data/content that is received from a backend service as described herein. The example user interfaces 500 may each includes browser tabs 504 that are each associated with a session between the browser application and a backend service using different user accounts. The backend service may be associated with a common domain resulting in the browser application storing a single session cookie at the client device for each of the different browser tabs sessions 504.

FIG. 5A shows an example of a first user interface 500a that is generated for a first browser tab session 504a between the browser application and the host service using a first user account. The first browser tab session 504a may display content that is retrieved using a first session token associated with the first user account. The first session token can correspond to a first access level/role associated with the first user account. The first access level/role may be used to determine what content, features, data, and/or other functions of the host service can be accessible by the first user account. In some cases, the user content, features, tools and/or other functions displayed in the user interface may be based on the first access level/role.

For example, the first user interface 502a shows an example of a host service that include a content collaboration platform. The content collaboration platform may host user generated pages that are used to share information. The first user account may be associated with an administrative user and the first access level/role may be used to determine what content and/or tools available to the first user account. For example, the content collaboration platform may include a content page 506 that was generated by the first user account and is a private page that has a defined access level(s)/role(s) that can view particular content on the content page 506. For example, the content page may include first content 508a and second content 508b. The first access level/role may correspond to the first user account being able to access all the content of the content page 506. Accordingly, the first user interface 502a for first browser tab session 504a may include both the first content 508a and the second content 508b.

FIG. 5B shows an example of a second user interface 500b that is generated for a second browser tab session 504b between the browser application and the host service using a second user account. The second user interface 500b may be displayed in response to the user selecting the second tab (TAB 2) and the session cookie may be updated to include session credentials (e.g., a second session token) corresponding to the second user account as described herein.

In some cases, in response to changing the view to the second browser tab session 504b, the browser application may display a graphical element 510 indicating that user credentials have been changed to the second account for the user. The graphical element 510 may be a temporary graphical element that overlays content on the page. Additionally or alternatively, the browser application can include graphical elements in other suitable locations that are displayed as part of the second user interface 502b and indicate an account that is associated with the second browser tab session 504b. As a user switches between different browser tabs this graphical element can be updated.

The second browser tab session 504b may display content that is retrieved using the session token associated with the second user account. The second session token can correspond to a second access level/role associated with the second user account. The second access level/role can define features, data, and/or other functions of the host service that are accessible by the second user account. In some cases, the user content, features, tools and/or other functions displayed in the user interface may be based on the second access level/role.

For example, the second user interface 502b shows an example of a host service that includes the content collaboration platform. The second access level/role may correspond to the second user account being able to access some but not all of the content on the content page 506. For example, the second access level/role may allow the second user account to access the first content 508a, which may include a general summary or other high level information. However, the second content 508b may not be accessible based on the second access level/role associated with the second user account. The second access level/role may not allow the user to view the second content. Accordingly, the host service may cause the browser to display a graphical element 508c that indicates restrict content has been removed. In other cases, the second user interface 502b may not show the second content and leave this space blank without showing the graphical element 508c.

FIG. 5C shows an example of a third user interface 500c that is generated for a third browser tab session 504c between the browser application and the host service using a third user account. The third user interface 500c may be displayed in response to the user selecting the third tab (TAB 3) and the session cookie may be updated to include session credentials (e.g., a third session token) corresponding to the third user account as described herein.

In some cases, in response to changing the view to the third browser tab session 504c, the browser application may display a graphical element 512 indicating that user credentials have been changed to the third account for the user. The graphical element 512 may be a temporary graphical element that overlays content on the page. Additionally or alternatively, the browser application can include graphical elements in other suitable locations that are displayed as part of the third user interface 502c and indicate an account that is associated with the third browser tab session 504*c*. As a user switches between different browser tabs this graphical element can be updated.

The third browser tab session 504*c* may display content that is retrieved using the session token associated with the third user account. The third session token can correspond to a third access level/role. The third access level/role may determine content, features, data, and/or other functions of the host service that is accessible by the third user account. In some cases, the user content, features, tools and/or other functions displayed in the user interface may be based on the third access level/role.

For example, the third user interface 502*c* shows an example of a host service that includes the content collaboration platform. The third access level/role may correspond to the third user account being able to access some limited content on the content page 506. For example, the third access level/role may not allow the third user account to access the first content 508*a* or the second content 510*b*. Accordingly, the host service may cause the browser application to display a graphical element 508*d* that indicates restrict content has been removed. In other cases, the third user interface 502*c* may not show the content page 506 and all or even indicate that it exists.

Figure 6:
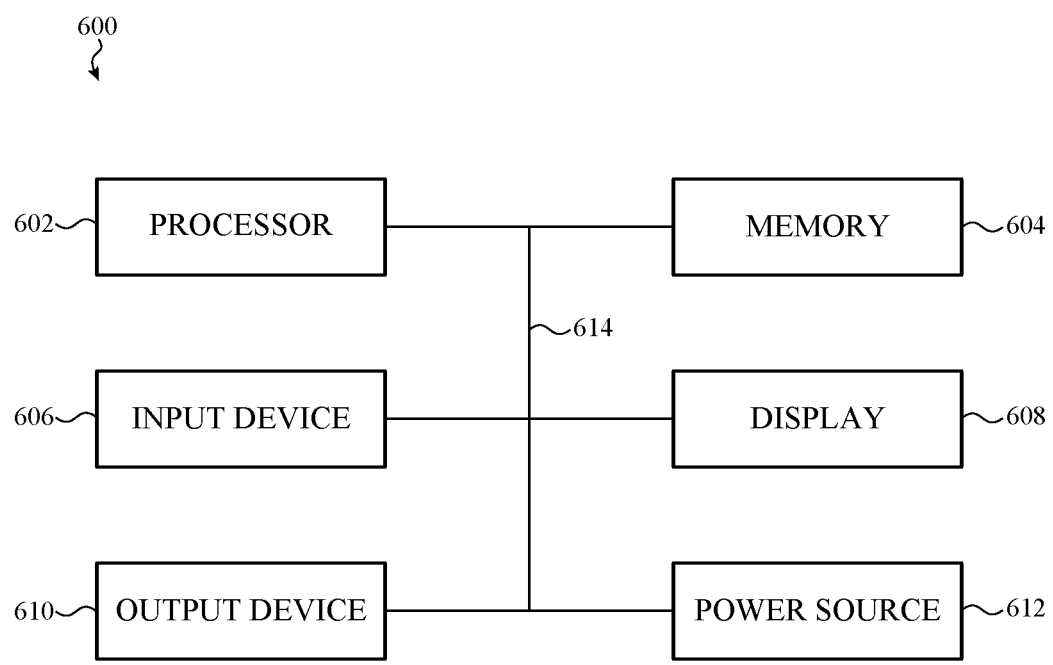
FIG. 6 shows an example electrical block diagram of an electronic device that may perform operation described herein.

FIG. 6 shows an example electrical block diagram of an electronic device 600 that may perform the operations described herein. The electronic device 600 may in some cases take the form of any of the electronic devices described with reference to FIGS. 1-5, including client devices, and/or servers or other computing devices associated with the system 100. The electronic device 600 can include one or more of a processor 602, a memory 604 or storage device, input devices 606, a display 608, output devices 610 and a power source 612. In some cases, various implementations of the electronic device 600 may lack some or all of these components and/or include additional or alternative components.

The processor 602 can control some or all of the operations of the electronic device 600. The processor 602 can communicate, either directly or indirectly, with some or all of the components of the electronic device 600. For example, a system bus or other communication mechanism 614 can provide communication between the processor 602, the power source 612, the memory 604, the input device(s) 606, and the output device(s) 610.

The processor 602 can be implemented as any electronic device capable of processing, receiving, or transmitting data or instructions. For example, the processor 602 can be a microprocessor, a central processor (CPU), an application-specific integrated circuit (ASIC), a digital signal processor (DSP), or combinations of such devices. As described herein, the term "processor" is meant to encompass a single processor or processor, multiple processors, multiple processors, or other suitably configured computing element or elements.

It should be noted that the components of the electronic device 600 can be controlled by multiple processors. For example, select components of the electronic device 600 (e.g., an input device 606) may be controlled by a first processor and other components of the electronic device 600 (e.g., the display 608) may be controlled by a second processor, where the first and second processors may or may not be in communication with each other.

The memory 604 can store electronic data that can be used by the electronic device 600. For example, the memory 604 can store electronic data or content such as, for example, audio and video files, documents and applications, device settings and user preferences, timing signals, control signals, and data structures or databases. The memory 604 can be configured as any type of memory. By way of example only, the memory 604 can be implemented as random access memory, read-only memory, Flash memory, removable memory, other types of storage elements, or combinations of such devices.

In various embodiments, the input devices 606 may include any suitable components for detecting inputs. Examples of input devices 606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 606 may be configured to detect one or more particular types of input and provide a signal (e.g., an input signal) corresponding to the detected input. The signal may be provided, for example, to the processor 602.

As discussed above, in some cases, the input device(s) 606 include a touch sensor (e.g., a capacitive touch sensor) integrated with the display 608 to provide a touch-sensitive display. Similarly, in some cases, the input device(s) 606 include a force sensor (e.g., a capacitive force sensor) integrated with the display 608 to provide a force-sensitive display. In some cases, input devices 606 and output devices 610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

In various embodiments, the display 608 provides a graphical output, for example associated with an operating system, user interface, and/or applications of the electronic device 600 (e.g., a chat user interface, an issue-tracking user interface, an issue-discovery user interface, etc.). In one embodiment, the display 608 includes one or more sensors and is configured as a touch-sensitive (e.g., single-touch, multi-touch) and/or force-sensitive display to receive inputs from a user. For example, the display 608 may be integrated with a touch sensor (e.g., a capacitive touch sensor) and/or a force sensor to provide a touch- and/or force-sensitive display. The display 608 is operably coupled to the processor 602 of the electronic device 600.

The display 608 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 608 is positioned beneath and viewable through a cover that forms at least a portion of an enclosure of the electronic device 600.

The output devices 610 may include any suitable components for providing outputs. Examples of output devices 610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 610 may be configured to receive one or more signals (e.g., an output signal provided by the processor 602) and provide an output corresponding to the signal.

The processor 602 may be operably coupled to the input devices 606 and the output devices 610. The processor 602 may be adapted to exchange signals with the input devices 606 and the output devices 610. For example, the processor 602 may receive an input signal from an input device 606 that corresponds to an input detected by the input device 606. The processor 602 may interpret the received input signal to determine whether to provide and/or change one or more outputs in response to the input signal. The processor 602 may then send an output signal to one or more of the output devices 610, to provide and/or change outputs as appropriate.

The power source 612 can be implemented with any device capable of providing energy to the electronic device 600. For example, the power source 612 may be one or more batteries or rechargeable batteries. Additionally or alternatively, the power source 612 can be a power connector or power cord that connects the electronic device 600 to another power source, such as a wall outlet.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processors, motion processors, sensor processors, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system (s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed for leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated for leveraging a discrete virtual machine, which are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for hosting secure content between a host service and a client device, the method comprising:
   cause display of a graphical user interface on a browser application executing on the client device, the graphical user interface comprising:
      a first tab associated with a first session between the browser application and the host service using a first account associated with a user; and
      a second tab associated with a second session between the browser application and the host service using a second account associated with the user;
   in response to a user selection of the first tab:
      receiving a first session token from the client device at a server operating the host service; and
      in response to determining that the first session token is valid, causing the browser application to display first secure content within the first tab associated with the first session in the first tab;
   in response to a user selection of the second tab while the first tab is displayed:
      receiving the first session token and a temporary account identifier associated with the second account at the server operating the host service;
      identifying, using the temporary account identifier, a second token stored by the host service and associated with the second account;
      in response to determining that the second token is valid, causing the browser application to display second secure content within the second tab associated with the second session.

2. The method of claim 1, wherein in response to determining that the second token is valid, causing the browser application to display, in the second tab, a graphical element indicating that user credentials have been changed to the second account for the user.

3. The method of claim 1, further comprising in response to determining that the second token is valid, automatically transmitting the second token to the client device for storage as part of a session cookie.

4. The method of claim 1, wherein:
   causing display of the browser application comprises:
      causing the client device to store a session cookie for the browser application;
      in response to the user selection of the first tab and determining that the first session token is valid, causing the client device to store the first session token as part of the session cookie; and
      in response to the user selection of the second tab and determining that the second token is valid, causing the client device to overwrite the part of the session cookie with information from the second token.

5. The method of claim 1, further comprising:
   in response to causing the browser application to display the first tab, suspending content updates to the second tab; and
   in response causing the browser application to display the second tab, suspending content updates for the first tab.

6. The method of claim 1, further comprising:
   in response to a user selection of the first tab and determining that the first session token has expired, causing the browser application to prompt the user for first user credentials associated with the first account; and
   in response to a user selection of the second tab and determining that the second token has expired, causing the browser application to prompt the user for second user credentials associated with the second account.

7. The method of claim 1, wherein:
   the first session and the second session are each associated with a same web-enabled service provided by the host service;
   the first user account is associated with a first user profile corresponding to a first set of permissions for the service; and
   the second account is associated with a second user profile corresponding to a second set of permissions for the service, the first set of permissions different than the second set of permissions.

8. The method of claim 7, wherein:
   the first set of permissions cause the browser application to display a first set of content items in the first tab;
   the second set of permissions cause the browser application to display a second set of content items in the second tab; and
   the second set of content items comprises a subset of the first set of content items.

9. The method of claim 1, wherein:
   the first session is associated with a first service hosted by the host service; and
   the second session is associated with a second service hosted by the host service.

10. A method for hosting secure browser sessions comprising multiple browser tabs each associated with a different user account, the method comprising:
   hosting, by a server of a domain, a browser application operating on a client device, the browser application comprising:
      a first tab comprising first secure content that is accessed at the domain using a first session token associated with a first user account for a user; and
      a second tab comprising second secure content that is accessed at the domain using a second session token associated with a second user account for the user;
   receiving, from the client device, a first request to display the first tab associated with the first user account, the first request comprising the first session token;
   in response to determining that the first session token is valid, causing the client device to refresh the first secure content of the first tab;
   receiving, from the client device while the first secure content on the first tab is displayed, a second request to display the second tab associated with the second user account, the second request comprising the first session token and a temporary account identifier for the second user account;

identifying, using the temporary account identifier, the second session token associated with the second user account; and in response to determining that the second session token is valid, causing the client device to refresh the second secure content of the second tab.

11. The method of claim 10, further comprising:

in response to receiving a request from the client device to instantiate the first tab at the browser application, causing the browser application to store a session cookie comprising the first session token; and in response to receiving a request from the client device to instantiate the second tab at the browser application, causing the browser application to rewrite at least part of the session cookie with the second session token.

12. The method of claim 11, wherein causing the browser application to rewrite at least part of the session cookie with the second session token comprises removing the first session token from the session cookie.

13. The method of claim 11, further comprising:

receiving, as part of the request to the request from the client device to instantiate the first tab, a first temporary account identifier; and in response to receiving the first temporary account identifier, storing a first associated between the first temporary account identifier and the first session token.

14. The method of claim 13, further comprising:

receiving, as part of the request to the request from the client device to instantiate the second tab, a second temporary account identifier; and in response to receiving the second temporary account identifier, storing a second association between the second temporary account identifier and the second session token.

15. The method of claim 14, wherein identifying the second session token comprises using the received temporary account identifier to identify the second association.

16. The method of claim 10 wherein causing the client device to refresh the second secure content of the second tab comprises causing the browser application to display, in the second tab, a graphical element indicating that user credentials have been changed to the second user account.

17. A server system comprising:

a memory allocation defined by:

a data store storing one or more executable assets; and a working memory allocation;

a processor allocation configured to load the one or more executable assets from the data store and into the working memory allocation to instantiate an instance of a client application on a client device, the one or more executable assets configured to:

cause display of a graphical user interface on a browser application executing on the client device, the graphical user interface comprising:

a first tab associated with a first session between the browser application and a host service using a first account associated with a user; and a second tab associated with a second session between the browser application and the host service using a second account associated with the user;

in response to a user selection of the first tab:

receive a first session token from the client device; and in response to determining that the first session token is valid, cause the browser application to display first secure content within the first tab associated with the first session in the first tab;

in response to a user selection of the second tab while the first tab is displayed:

receive the first session token and a temporary account identifier associated with the second account;

identify, using the temporary account identifier, a second token stored by the host service and associated with the second account;

in response to determining that the second token is valid, cause the browser application to display second secure content within the second tab associated with the second session.

18. The server system of claim 17, wherein the one or more executable assets is configured to, in response to determining that the second token is valid, cause the browser application to display a graphical element indicating that user credentials have been changed to the second account for the user.

19. The server system of claim 17, wherein the one or more executable assets is further configured to, response to determining that the second token is valid, transmit the second token to the client device for storage as part of a session cookie.

20. The server system of claim 19, wherein transmitting the second token to the client device causes a session token stored as part of the session cookie to be replaced by the second token.

* * * * *